(12) United States Patent
Hubbard

(10) Patent No.: US 10,616,456 B2
(45) Date of Patent: Apr. 7, 2020

(54) ENHANCED SYSTEM FOR LOWERING AND GUIDING 3-D CAMERA APPARATUS

(71) Applicant: John Hubbard, Hampstead, NH (US)

(72) Inventor: John Hubbard, Hampstead, NH (US)

( * ) Notice: Subject to any disclaimer, the term of this patent is extended or adjusted under 35 U.S.C. 154(b) by 0 days.

(21) Appl. No.: 15/973,119

(22) Filed: May 7, 2018

(65) Prior Publication Data
US 2018/0324335 A1   Nov. 8, 2018

Related U.S. Application Data

(60) Provisional application No. 62/512,390, filed on May 30, 2017, provisional application No. 62/501,955, filed on May 5, 2017.

(51) Int. Cl.
| | |
|---|---|
| *H04N 5/225* | (2006.01) |
| *F16M 11/08* | (2006.01) |
| *F16M 11/20* | (2006.01) |
| *H04N 13/204* | (2018.01) |
| *F16M 11/24* | (2006.01) |
| *G03B 17/56* | (2006.01) |
| *F16M 11/18* | (2006.01) |
| *F16M 11/04* | (2006.01) |
| *G03B 37/00* | (2006.01) |
| *F16M 13/02* | (2006.01) |

(52) U.S. Cl.
CPC ......... *H04N 5/2253* (2013.01); *F16M 11/046* (2013.01); *F16M 11/08* (2013.01); *F16M 11/18* (2013.01); *F16M 11/2014* (2013.01); *F16M 11/24* (2013.01); *F16M 11/245* (2013.01); *F16M 13/02* (2013.01); *G03B 17/561* (2013.01); *G03B 37/005* (2013.01); *H04N 5/2251* (2013.01); *H04N 13/204* (2018.05); *F16M 2200/00* (2013.01); *H04N 2005/2255* (2013.01)

(58) Field of Classification Search
CPC .. H04N 5/2253; H04N 5/2251; H04N 13/204; H04N 2005/2255; F16M 11/2014; F16M 11/08; F16M 11/24; F16M 2200/00
See application file for complete search history.

(56) References Cited

U.S. PATENT DOCUMENTS

| | | | |
|---|---|---|---|
| 2006/0033674 A1* | 2/2006 | Essig, Jr. | B01D 61/06 343/912 |
| 2016/0255254 A1* | 9/2016 | Freeman | H04N 5/2254 348/374 |
| 2017/0152990 A1* | 6/2017 | Kielland | A45F 5/00 |
| 2017/0299106 A1* | 10/2017 | Lindelof | F16L 55/162 |

* cited by examiner

*Primary Examiner* — Tracy Y. Li
(74) *Attorney, Agent, or Firm* — Bay State IP, LLC

(57) ABSTRACT

A system for lowering and guiding a 3D camera apparatus which includes a pole, top mount, at least one cage bar, a base mount and assembly. The system pairs with a 3D camera, keeping the camera safely in place while allowing the camera to move and rotate as designed. The system allows for a user to control the camera via the system from above by lowering the camera and system into a manhole or septic tank, allowing a camera to take pictures from the lowest desired point all the way up to the top of the hole.

10 Claims, 16 Drawing Sheets

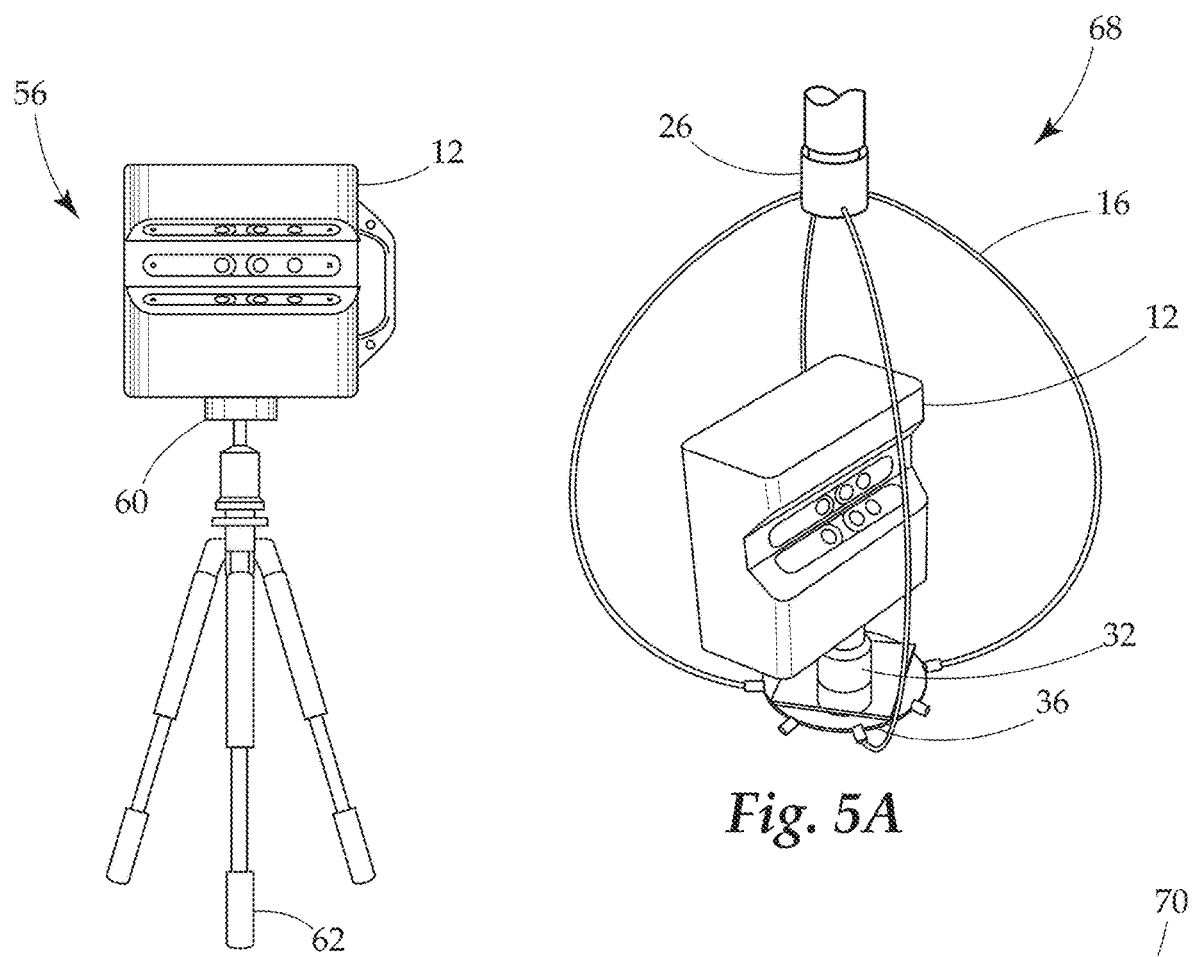
Fig. 4
Fig. 5A
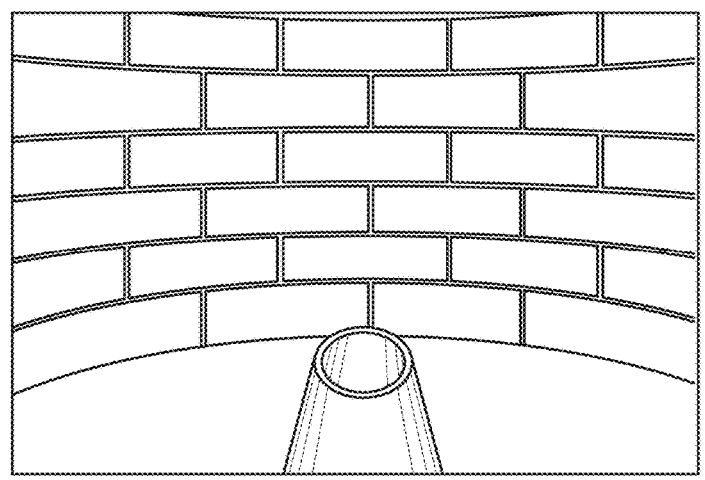
Fig. 5B

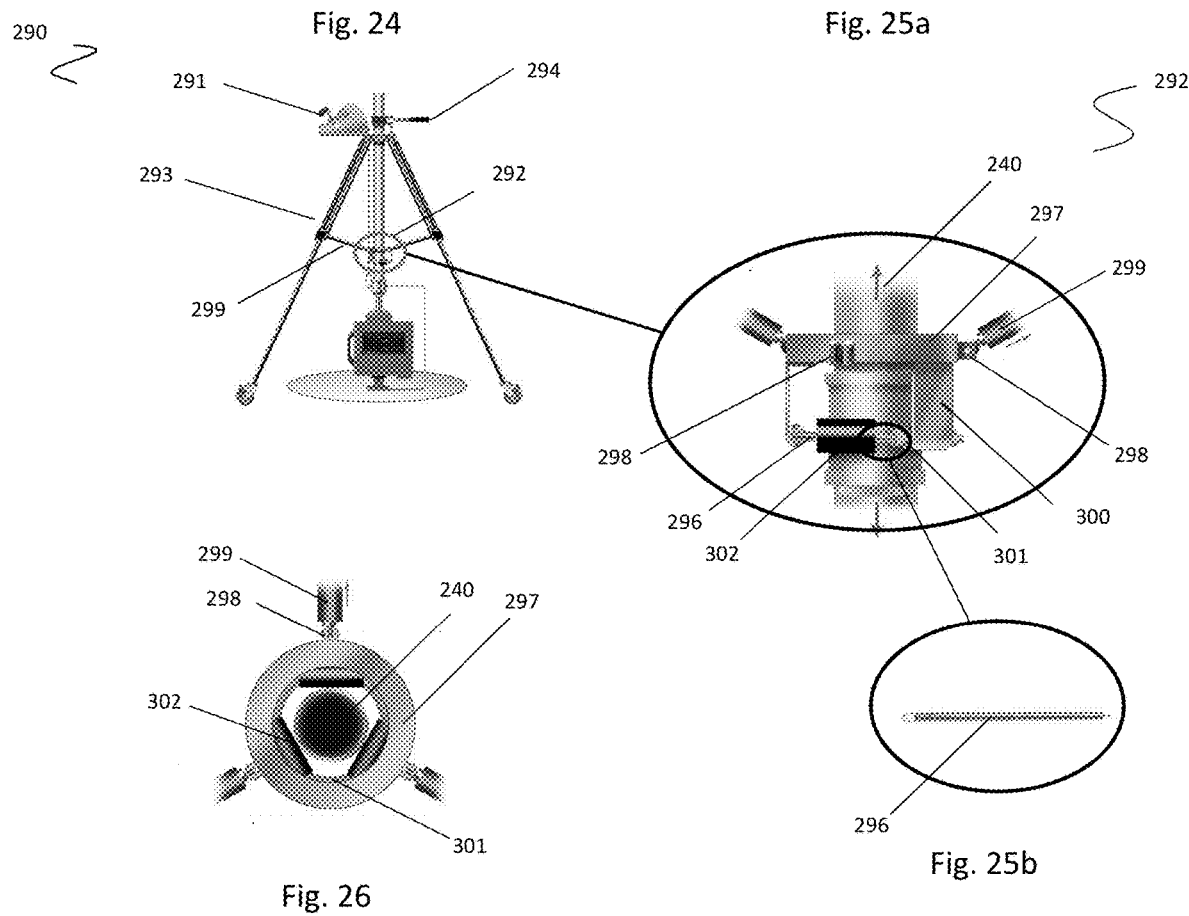

Fig. 28
Fig. 29
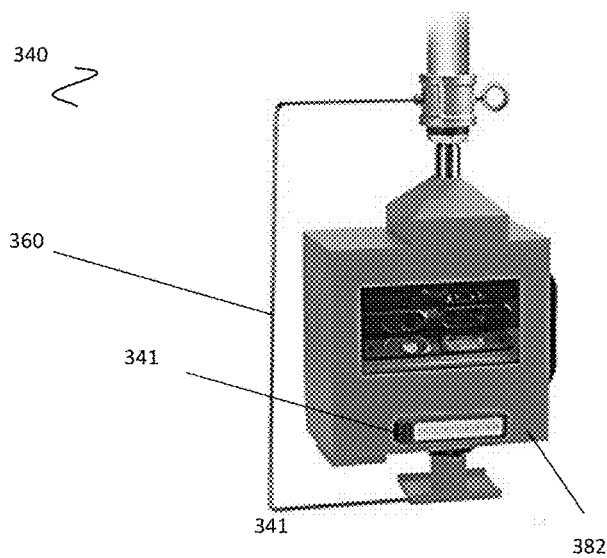
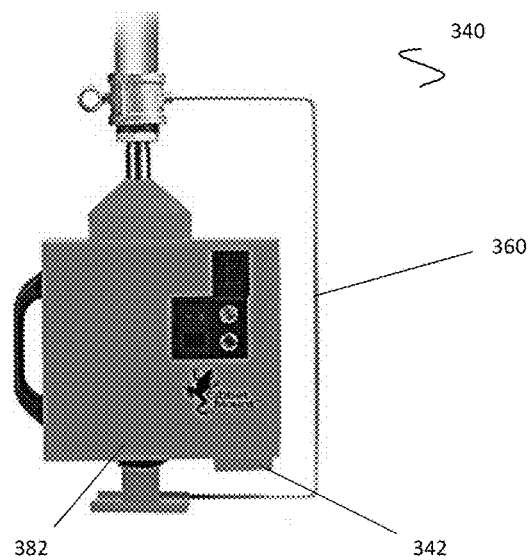
Fig. 30
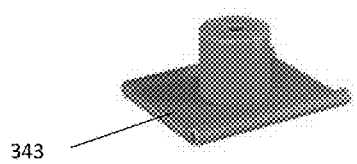
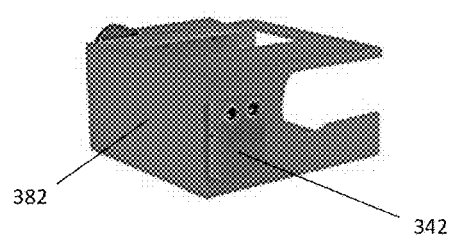
Fig. 31

Fig. 32
Fig. 33
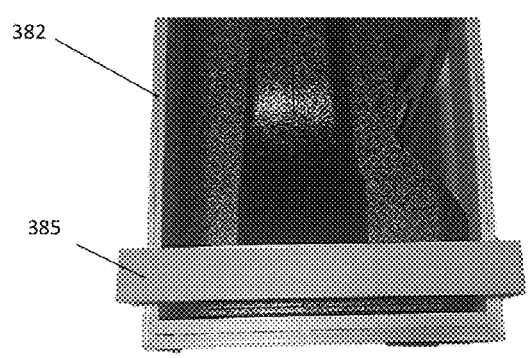
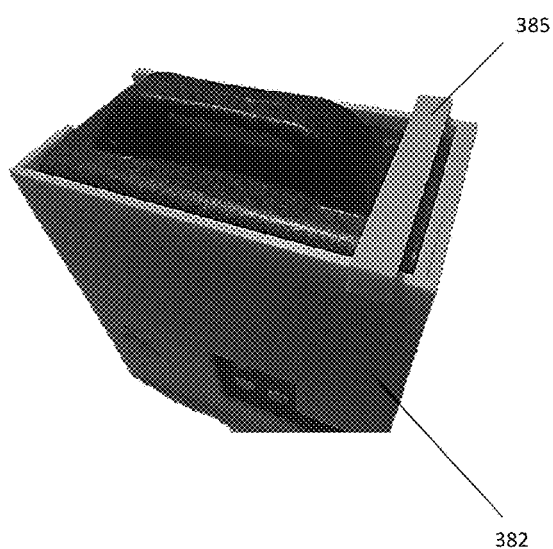

ENHANCED SYSTEM FOR LOWERING AND GUIDING 3-D CAMERA APPARATUS

CROSS REFERENCE TO RELATED APPLICATION

This application claims priority to and takes the benefit of U.S. Provisional Patent Application Ser. No. 62/501,955 filed on May 5, 2017 and U.S. Provisional Patent Application Ser. No. 62/512,390 filed on May 30, 2017, the contents of which both applications are incorporated by reference.

FIELD OF THE INVENTION

The present invention relates generally to cameras and other such surveillance systems for taking measurements in confined regions or spaces such as manholes and septic tanks, and, more particularly, to a system and apparatus for lowering and guiding instruments such 3-D camera apparatuses and the like taking advanced pictures and measurements of a manhole and the like.

BACKGROUND OF THE INVENTION

Urban and suburban utility systems, such as septic, sewage and lighting systems, normally utilize a network vertical and horizontal tubes located beneath city and town streets Most of these may be accessed by cylindrical fixtures, normally called manholes. Additionally, it behooves public works officials and departments to have access to accurate date, including pictures, relating to location, condition and other information related to manholes. One example of important information is that it is crucial to know the dimensions and layout of each manhole in order to plan the re-lining of sewers or other renovation work.

This type of information is not always readily available or easily attainable. In many locations, the manholes were installed over many years, with several years in between, often using differing methods and often with little or no records being kept concerning their location or layout. Even today, record keeping is not at its best, sometimes non-existent.

In order to create a solution to this issue, many municipalities have decided to map their sewer systems including details related to manholes and inverts. This is a large project since each municipality can have thousands of manholes and inverts making precision and cost causes for concern. Since no specific tool or system has been developed to tackle this task, readings are inaccurate and cost is high as more expensive equipment is being used to supplement. The equipment is hard to use, often requiring more than one person. Once measurements have been taken, there is yet still room for error, as the next step requires sketching the manhole and transferring the date to an electronic database. Many times the information is so inaccurate that it cannot be relied upon and a second reading must take place wasting more time and money.

SUMMARY OF THE INVENTION

The instant apparatus and system, as illustrated herein, is clearly not anticipated, rendered obvious, or even present in any of the prior art mechanisms, either alone or in any combination thereof. The versatile system, method and series of apparatuses relating to camera accessories and fixtures, apparatuses to greater facilitate camera systems to operate under challenging conditions are illustrated. Thus the several embodiments of the instant apparatus are illustrated herein.

It is therefore an objective of the instant system to introduce a novel system or platform for a camera system.

It is therefore an objective of the instant system to introduce a novel system or platform for a 3D Camera system.

It is therefore an objective of the instant system to introduce novel system or platform for a 3D Camera system.

It is therefore an objective of the instant system to introduce a novel platform for a 3D Camera which does not inhibit picture integrity.

It is therefore an objective of the instant system to introduce a novel platform for a 3D Camera which allows the 3D camera to rotate.

It is therefore an objective of the instant system to introduce a novel platform for a 3D Camera, in one embodiment the system by way of a three-sided receptacle that supports the 3D Camera by sliding the camera into the side of the cage.

It is therefore an objective of the instant system to introduce a novel platform for a 3D Camera which supports the camera from above and allows for free motor rotation.

It is therefore an objective of the instant system to introduce a novel bearing system for a 3D Camera platform which allows for free motor rotation.

It is therefore an objective of the instant system to introduce a novel bearing system for 3D Camera platform which attaches by screw assembly to the base of the camera.

It is therefore an objective of the instant system to introduce a novel bearing system for a 3D Camera, to be able to function when supported from above, instead of its usual design constraint of being supported from below as on a tripod mount.

It is therefore an objective of the instant system to introduce a novel bearing system for a 3D Camera platform which attaches a metal or plastic plate to the top of the camera where it is fitted with a ball bearing assembly which is in turn coupled to the end of a pole or series of poles allowing free rotation provided by the 3D camera's own internal motor.

It is therefore an objective of the instant system to introduce a novel bearing system for a 3D Camera platform which uses tension or clamps to secure the cage bars to the base plate to prevent the 3D camera from slipping out of place.

It is therefore an objective of the instant system to introduce a novel bearing system with cage bars that are flexible.

It is therefore an objective of the instant system to introduce a novel bearing system with a metal strut to keep the base place from rotating, allowing the 3D camera to function normally.

It is therefore an objective of the instant system to introduce a novel bearing system to allow a 3D camera to scan the inside of a manhole from the lowest desired point in the hole up the surface.

It is also an additional object of the instant system to have a novel bearing system that is inexpensive, portable, precise and easy to use.

These together, with the other objectives of the device, along with the various features of novelty, which characterize the apparatus, are pointed out with particularity in the claims annexed to and forming a part of this disclosure. For a better understanding of the mechanism, its operating advantages, and the specific objectives attained by its use, study of the accompanying drawings and descriptive matter, in which there are illustrations of the preferred embodiments, should be conducted.

There has thus been outlined, rather broadly, the more important features of the versatile integrated Instant System, and series of accompanying systems and apparatuses and embodiments in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates a perspective front view of a 3-D camera mounted on a conventional tripod apparatus for open air operation.

FIG. 5A illustrates a perspective view of an embodiment of the instant system for encasing and delivering a camera including a containment vessel, in use entering a manhole.

FIG. 5B illustrates a perspective view of an image captured by a 3D camera while in use with the instant system for encasing and delivering a camera.

FIG. 24 illustrates a side view of an additional embodiment of a tripod based delivery system featuring a hand crank system which works in conjunction with a spring guidance system, a set of three telescoping leg members.

FIG. 25A illustrates a side exploded view of the spring guidance system of FIG. 24.

FIG. 25B illustrates a side exploded view of the spring common extension spring as removed from the system.

FIG. 26 illustrates a top exploded view of the spring guidance system including the middle collar and tabs, the set of lateral stabilizing struts, the retaining hooks, and the cylindrically disposed common extension spring conduits.

FIG. 28 illustrates a front perspective view of an additional embodiment of the camera delivery system with the camera embarked illustrating, a containment vessel, a uni-strut rectangular retaining arm and an LED light fixture affixed to the front of the camera delivery system.

FIG. 29 illustrates a rear perspective view of an additional embodiment of the camera delivery system with the camera embarked within the containment vessel and illustrating a uni-strut rectangular retaining arm and a sonic sensor proximity gage.

FIG. 30 illustrates a front perspective view of an additional embodiment of base mount designed specifically for operation with the single or uni-strut rectangular retaining arm the camera delivery system.

FIG. 31 illustrates a bottom perspective view of the containment vessel without the camera embarked and illustrating the sonic sensor proximity gage affixed to the lower portion of the containment vessel.

FIG. 32 illustrates a side view of the containment vessel 382 without the camera embarked and illustrating the removably attached locking bar affixed to the side portion of the containment vessel.

FIG. 33 illustrates a side perspective view of the containment vessel without the camera embarked and illustrating the removably attached locking bar affixed to the side portion of the containment vessel.

DETAILED DESCRIPTION OF THE INVENTION

The detailed description set forth below is intended as a description of presently preferred embodiments of the invention and does not represent the only forms in which the instant invention may be construed and/or utilized. However, it is to be understood that the same or equivalent functions may be accomplished by different embodiments and are also intended to be encompassed within the scope of the invention.

The system is designed to uniquely satisfy three (3) critical criteria as an apparatus for lowering and guiding 3D cameras, that includes being wholly portable, easy to use, and simultaneously inexpensive. First, the camera apparatus is designed to be portable in order to allow the unit to be transferred to a specific location as it relates to satisfying a unique need within that environment in a timely and cost efficient manner. Of great importance here, the camera apparatus can be specific and customized into an environment; hence, the camera apparatus is a practical and efficient means to save time and ultimately costs.

Second the camera apparatus is designed to be easy to use in numerous embodiments, including a portable embodiment for users to carry with them.

Third, the camera apparatus is designed to be inexpensive. The apparatus comprises one piece comprised of multiple parts. The apparatus is comprised of inexpensive materials.

In the instant system, the top may possess varying intended shapes, angles and sizes, relative to the desired size for transport and size of the manhole.

Within the several differing embodiments illustrated graphically and discussed within the descriptive matter herein, some embodiments include systems wherein the camera is encased only by intersection of members above and below the camera. Still, other embodiments will illustrate a more intricate structure wherein the camera is almost completely encased by a containment vessel.

Figure 1:
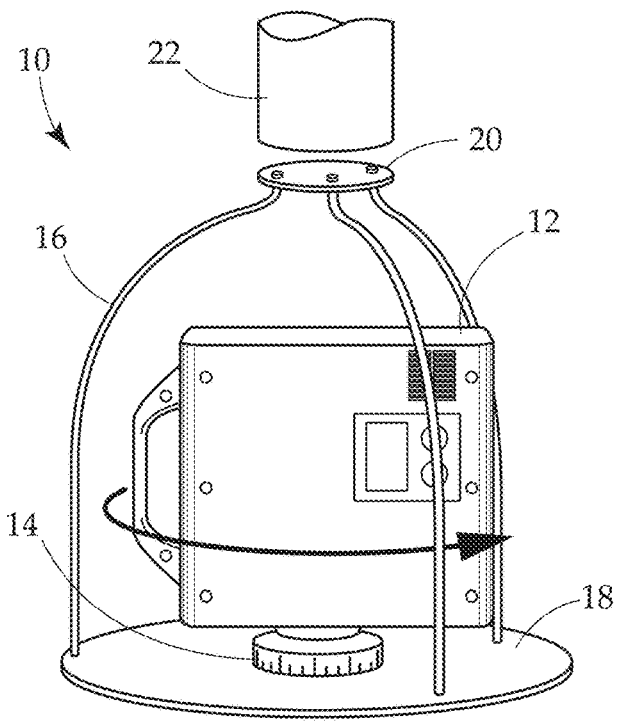
FIG. 1 illustrates a front perspective view of one embodiment of the instant system for encasing and delivering a camera, deemed Gibbet Mount apparatus version one (1), including three bowed retaining arms or cage bars and further illustrating one version of a bottom mount plate and a first rotating joint of the present apparatus.

FIG. 1 illustrates a front perspective view of one embodiment of the instant system for encasing and delivering a camera 10, deemed GibbetMount apparatus version one (1) wherein the camera 12 is supported by a set of three bowed retaining arms 16 and in combination with a top mount and a bottom mounting plate. Further illustrated is a first version of a bottom mounting plate 18 and a first rotating joint 14 of the present apparatus. The pole 22 is in communication with the top mount 20. The top mount 20 is in communication with at least one cage bar 16. The at least one cage bar 16 is in communication with the bottom mounting plate 18 which is in further communication with the first rotating joint 14. The rotating joint 14 is in communication with the supported camera apparatus 12.

Figure 2:
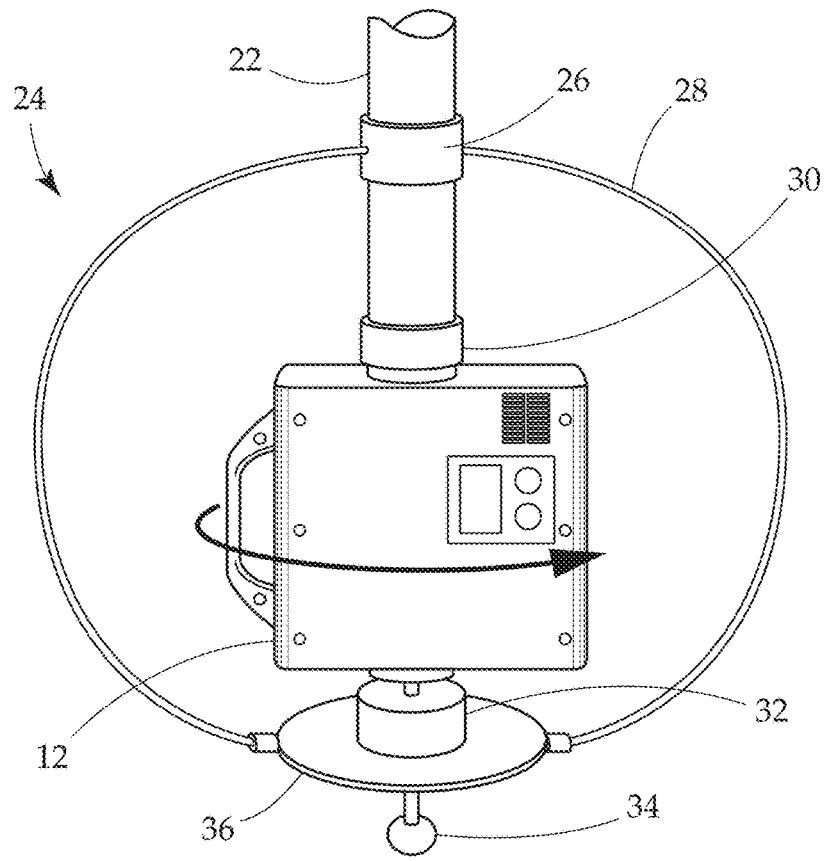
FIG. 2 illustrates a front perspective view of one embodiment of the instant system for encasing and delivering a camera, deemed Gibbet Mount apparatus version two (2) including two bowed retaining arms or cage bars and further illustrating one version of a bottom mount plate and a second rotating joint of the present apparatus.

FIG. 2 illustrates a front perspective view of an additional embodiment of the instant system for encasing and delivering a camera 24, deemed GibbetMount apparatus version two (2) wherein the camera 12 is supported by a set of two bowed retaining arms 28 or cage bars, in combination with a top mount and a second version of a bottom mount plate 36 and a second rotating joint 32 of the present apparatus. The pole 24 is in communication with hardware 26 by screw attachment. Hardware 26 is in communication with upper mount 30 which is in further communication with the supported camera apparatus 12. Hardware 26 is also in communication with the circular bar 28. The circular bar is in communication at one end with hardware 26 and at the opposite end with base or bottom mount plate 36. The base mount is in further communication with the rotating joint 32. The rotating joint 32 is in communication with bottom support 34 via at least one aperture through the center of the rotating joint 32 and the base mount 36.

Figure 3A:
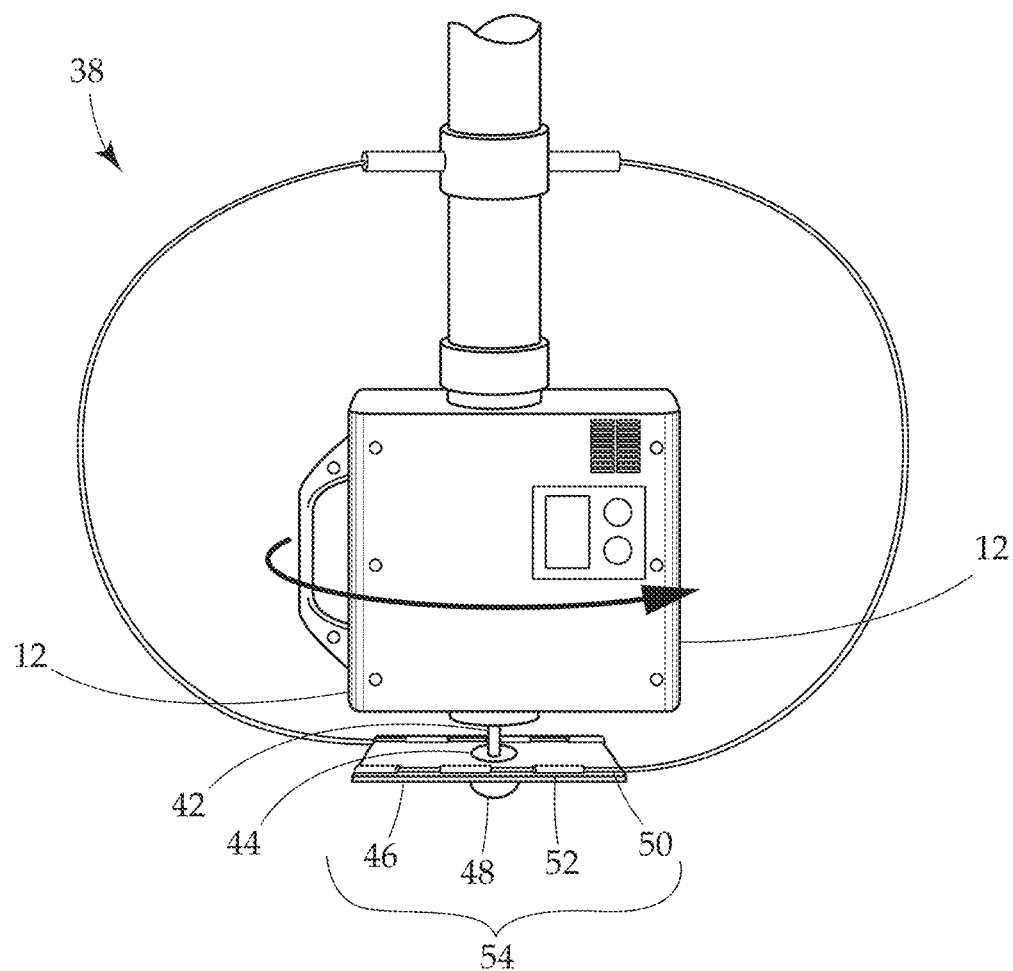
FIG. 3A illustrates a front perspective view of an additional embodiment of the instant system for encasing and delivering a camera, deemed Gibbet Mount apparatus version three (3) including two bowed retaining arms or cage bars and further illustrating one version of a bottom mount plate and a third rotating joint of the present apparatus.
Figure 3B:
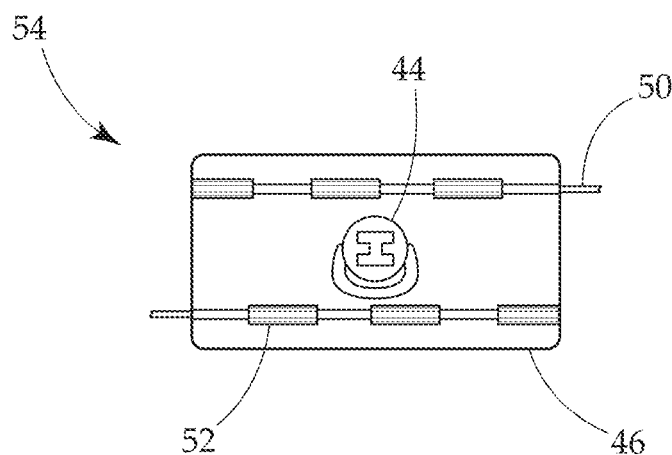
FIG. 3B illustrates a top plan view of the base mount apparatus illustrated in FIG. 3A, herein removed from the system for viewing purposes.

FIG. 3A illustrates a front perspective view of an additional embodiment of the instant system for encasing and delivering a camera 38, deemed GibbetMount apparatus version three (3) further illustrating a side view of the base mount apparatus. FIG. 3B illustrates a top plan view of the base mount 54 illustrated in FIG. 3A. The base mount 54 comprises at least a supporting pole 42, a rotating joint 44, and a flat base 46. The supporting pole 42 extends from the camera 12 through the rotating joint 44 and flat base 46 and is in communication with the base cap 48 via screw attachment.

FIG. 4 illustrates a front perspective view of a 3-D camera mounted on a conventional tripod apparatus for open air operation 56. The camera 12 is mounted to the tripod base 62. The tripod base 62 is in communication with the mount 60 via screw attachment. The mount 60 is in communication with the camera 12.

FIG. 5A illustrates a perspective view of an embodiment of the instant system for encasing and delivering a camera 12, in use entering a manhole 68. In one embodiment the pole 22 is in communication with the top mount 20 and the top mount 20 is in communication with at least one cage bar 16. The at least one cage bar 16 is in communication with the base mount 36. The camera 12 is in communication with the base mount 36. The base mount is in further communication with the rotating joint 32. The rotating joint 32 is in communication with bottom support 34 via at least one aperture through the center of the rotating joint 32 and the base mount 36.

FIG. 5B illustrates a perspective view of an image 70 captured by a 3D camera while in use with the instant system for encasing and delivering a camera.

Figure 6:
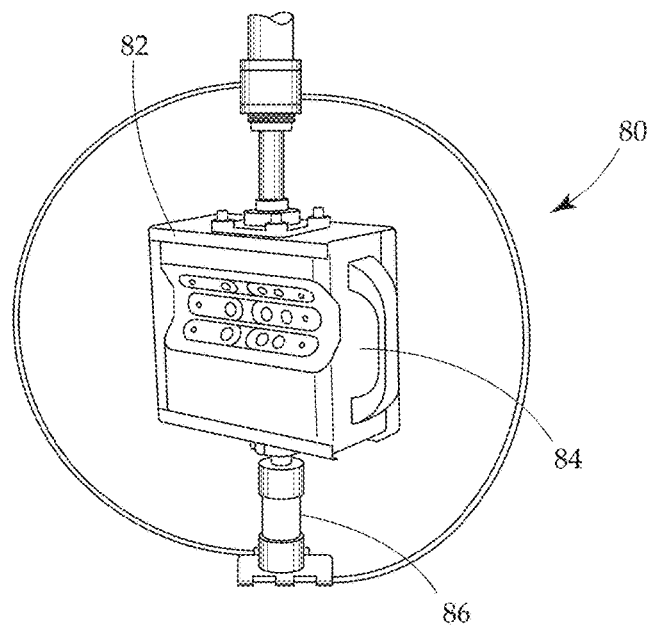
FIG. 6 illustrates a side perspective view of an embodiment of the instant system for encasing and delivering a camera, including a containment vessel, two bowed retaining arms or cage bars and an elongated fourth rotating joint.

FIG. 6 illustrates a side perspective view of an embodiment of the instant system for encasing and delivering a camera 80, including a containment vessel 82, two bowed retaining arms or cage bars and an elongated fourth rotating joint 86. In one embodiment, a three-sided receptacle to hold the 3D camera 82. The receptacle 82 comprises a bottom slot 84 to allow any rotational element attached to the 3D camera to slide in and out of the receptacle 82 easily. Additionally, the receptacle lacks any structure on one side in order to receive the camera. One embodiment further comprises an elongated rotating joint 86.

Figure 7:
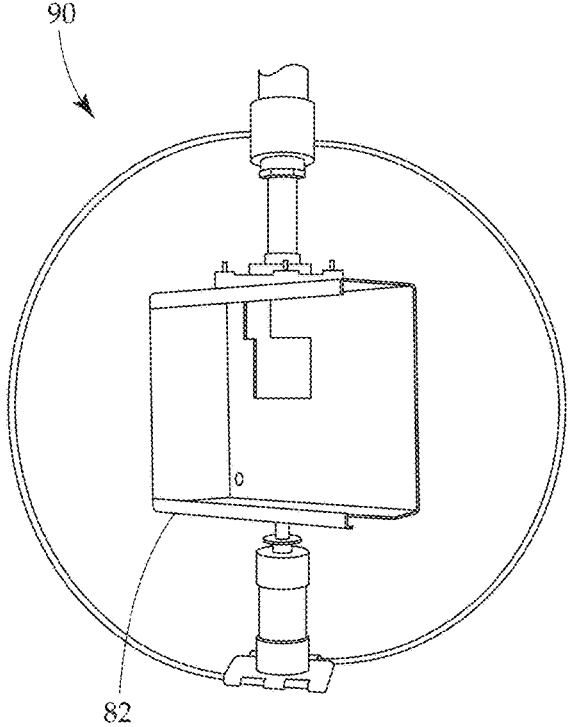
FIG. 7 illustrates a side perspective view of an embodiment of the instant system for encasing and delivering a camera, including a containment vessel, two bowed retaining arms or cage bars and an elongated fourth rotating joint and wherein the camera is not present.

FIG. 7 a side perspective view of an embodiment of the instant system for encasing and delivering a camera 90, and a retaining vessel 82, two bowed retaining arms or cage bars and an elongated fourth rotating joint and wherein the camera is not present.

Figure 8:
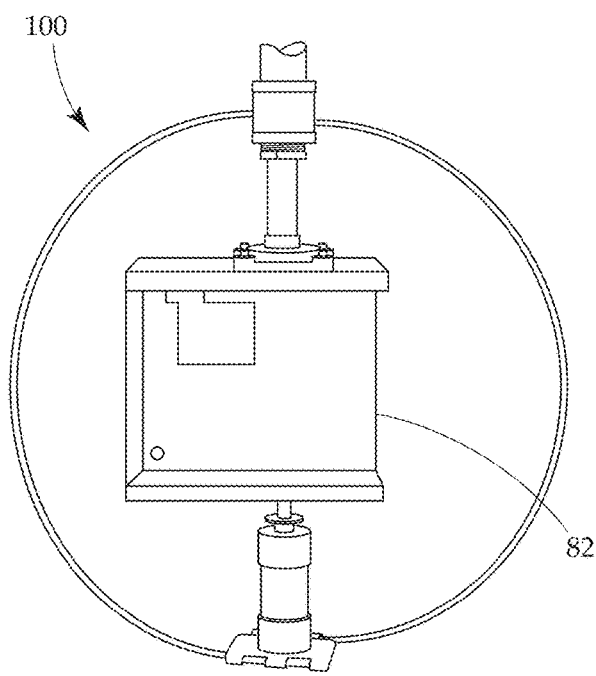
FIG. 8 illustrates a front perspective view of an embodiment of the instant system for encasing and delivering a camera, including a containment vessel, two bowed retaining arms or cage bars and an elongated fourth rotating joint and wherein the camera is not present.

FIG. 8 a front perspective view of an embodiment of the instant system for encasing and delivering a camera 100, and a retaining vessel 82, two bowed retaining arms or cage bars and an elongated fourth rotating joint and wherein the camera is not present.

Figure 9:
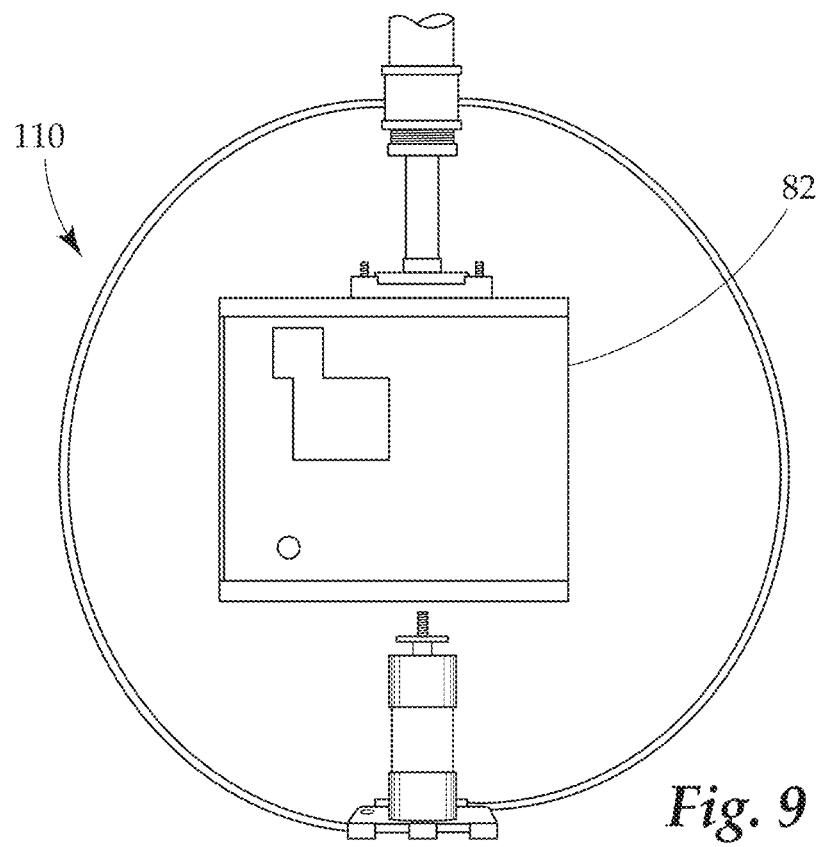
FIG. 9 illustrates a front view of an embodiment of the instant system for encasing and delivering a camera, including a containment vessel, two bowed retaining arms or cage bars and an elongated fourth rotating joint and wherein the camera is not present.

FIG. 9 is a front view of an embodiment of the instant system for encasing and delivering a camera 110, and a retaining vessel 82, two bowed retaining arms or cage bars and an elongated fourth rotating joint and wherein the camera is not present.

Figure 10:
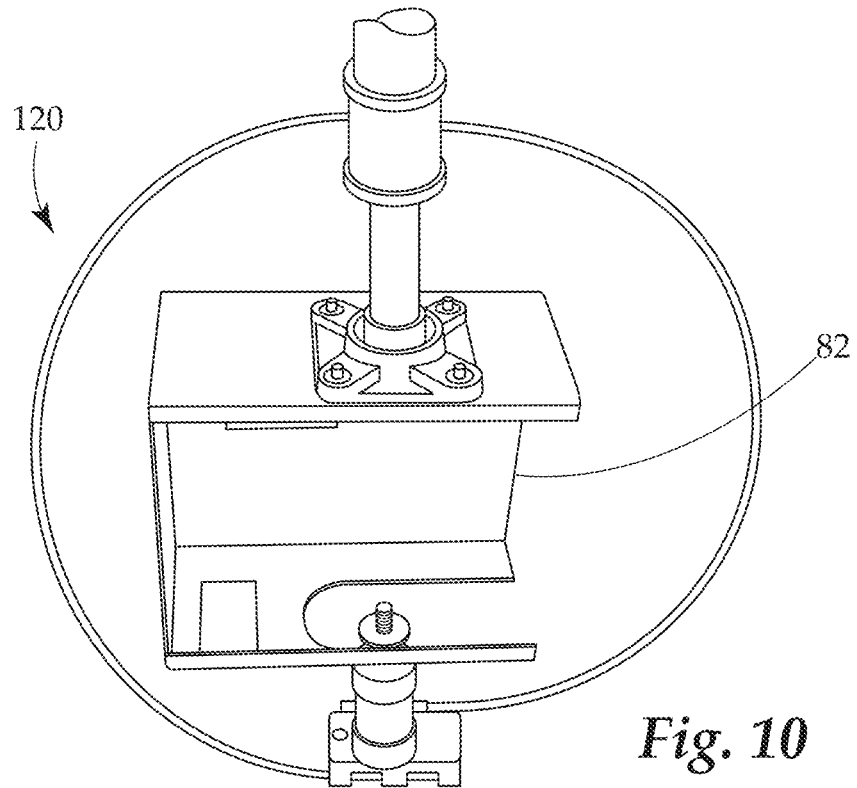
FIG. 10 illustrates a top perspective view of an embodiment of the instant system for encasing and delivering a camera, including a containment vessel, two bowed retaining arms or cage bars and an elongated fourth rotating joint and wherein the camera is not present.

FIG. 10 illustrates a perspective top, front view of one embodiment of a retaining vessel 82 of the apparatus without a 3D camera 120.

Figure 11:
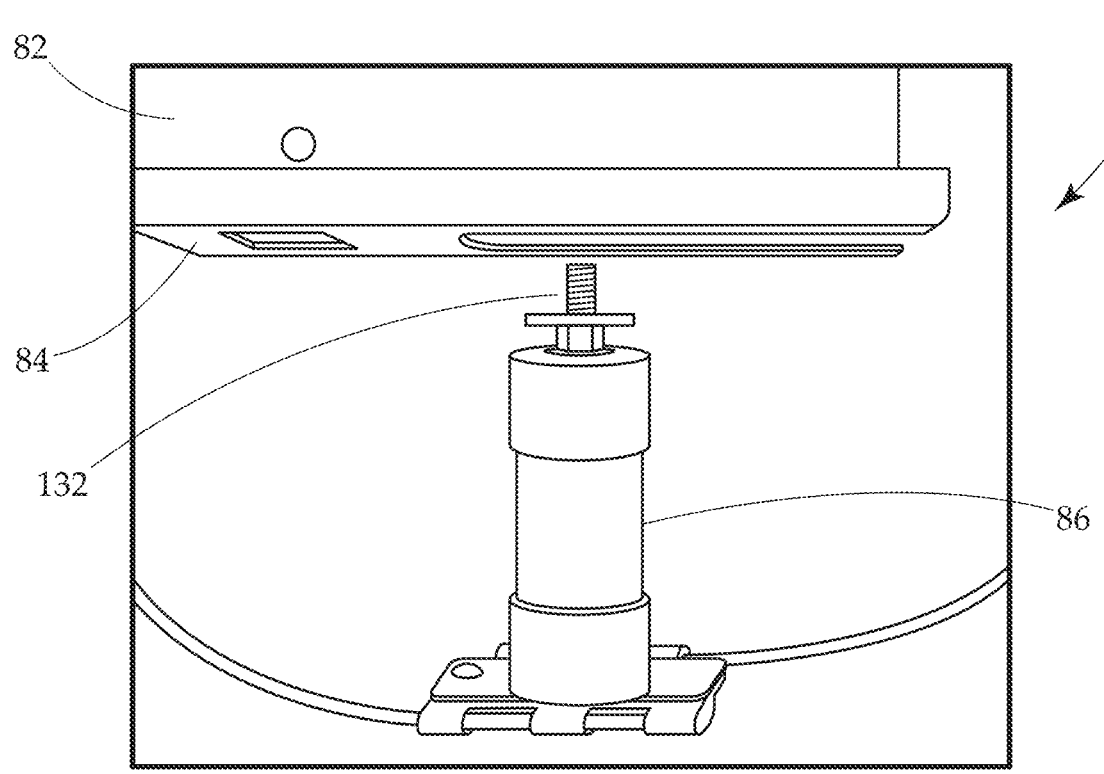
FIG. 11 illustrates a bottom perspective view of an embodiment of the instant system for encasing and delivering a camera further illustrating the elongated fourth rotating joint for rotating the camera apparatus 360°, located on a one version of a bottom mount plate of the present apparatus.
Figure 12:
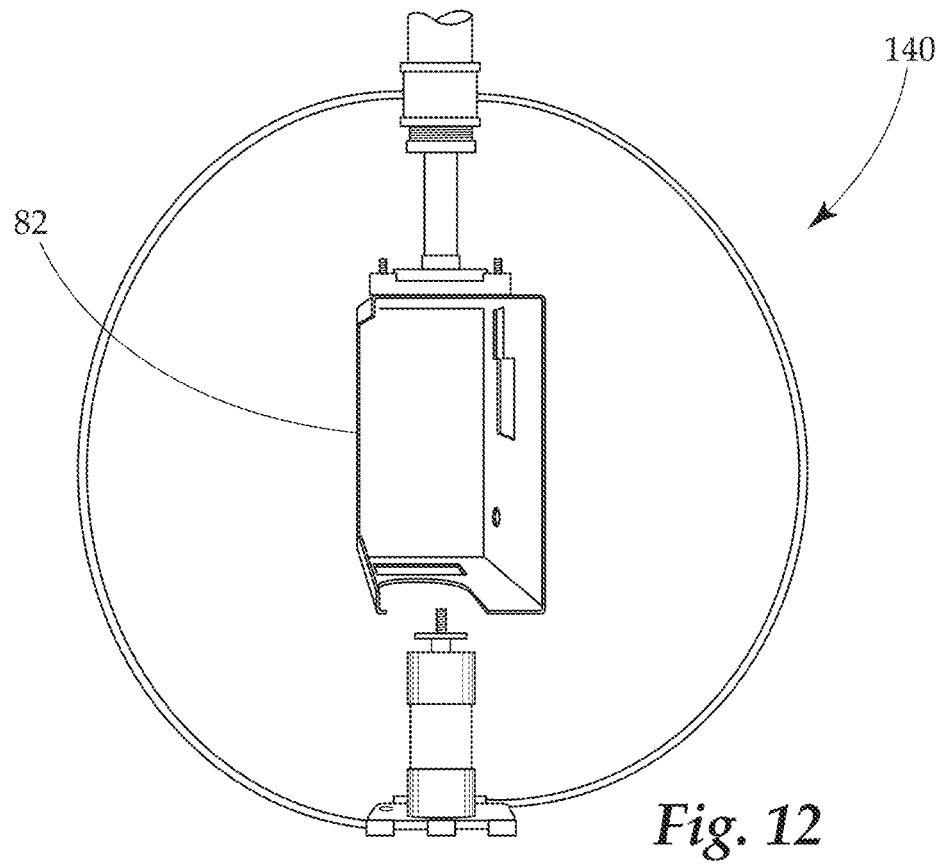
FIG. 12 illustrates a side perspective view of an embodiment of the instant system for encasing and delivering a camera, including a containment vessel, two bowed retaining arms or cage bars and an elongated fourth rotating joint and wherein the camera is not present.

FIG. 11 illustrates a perspective view of one embodiment of an elongated fourth rotating joint 86 on the bottom portion of the present apparatus. The elongated fourth rotating joint 86 is removably attached to the 3D camera by screw assembly 132 through the bottom slot 84 of the three-sided receptacle 82. The elongated fourth rotating joint 86 may have numerous embodiments for specific situations which may require lengthening or shortening of the elongated fourth rotating joint 86. FIG. 12 illustrates a perspective side view of the one embodiment 82 of the apparatus without a 3D camera 140.

FIG. 12 illustrates a side perspective view of an embodiment of the instant system for encasing and delivering a camera, including a containment vessel 82, two bowed retaining arms or cage bars and an elongated fourth rotating joint and wherein the camera is not present.

Figure 13:
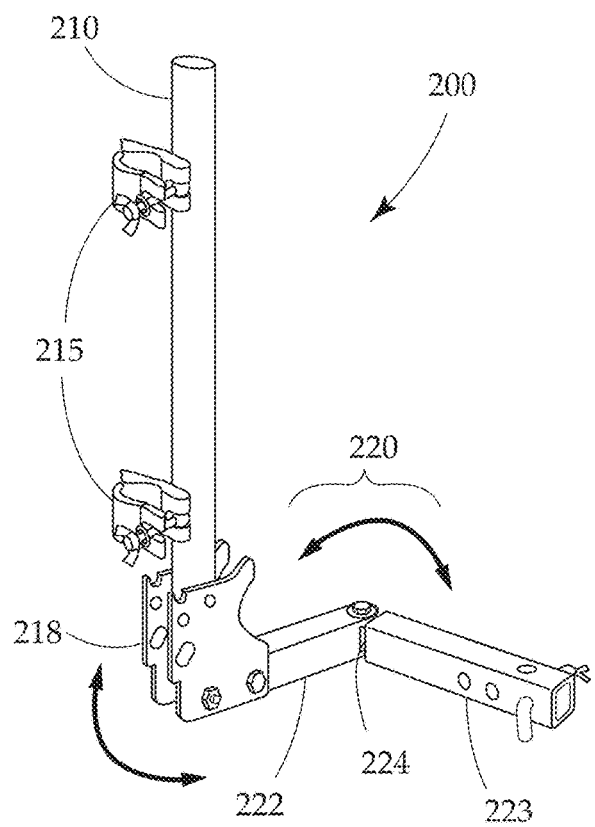
FIG. 13 illustrates a left side perspective view of an embodiment of a mounting system for deployment of the instant system for encasing and delivering a camera via an embarked vehicle, illustrating the main linkage or mating system that links the vehicle to mounting and lowering shaft for the encasing and delivering system, and further illustrating the degrees of freedom in the vertical and horizontal plane afforded to the mating system and illustrating the trailer hitch mechanism.

FIG. 13 illustrates a left side perspective view of an embodiment of a vehicle mounting system 200 for deployment of the instant system for encasing and delivering a camera via an embarked vehicle. Illustrated herein are the receiving shaft 210 for retaining and lowering the casing guide shaft 230 (shown in FIG. 14) and the clamps 215 of receiving shaft, (two clamps 215 are embarked but more may be utilized) which are utilized to lower and secure the casing guide shaft 230 (shown in FIG. 14).

Further illustrated are the trailer hitch linkage 220, which includes a set of bar members, here shown as a first rectangular bar member 222 and a second bar member 223, joining by a hinge 224 in order to provide rotational degrees of freedom for maneuvering of the casing guide shaft 240 into proper deployment position. The hinged linkage design also provides for easy stowage as the set are of bar members folds upon itself. Further illustrated is the trailer hitch mechanism 225 which allows for seamless attachment and detachment to a vehicle.

The receiving shaft 210 and the trailer hitch linkage 220 are joined by the a rotation socket joint 218 which allows for angular displacement of the receiving shaft 210 in relation to the trailer hitch linkage 220 thus illustrating the degrees of freedom in the vertical and horizontal plane afforded to the mating system.

Figure 14:
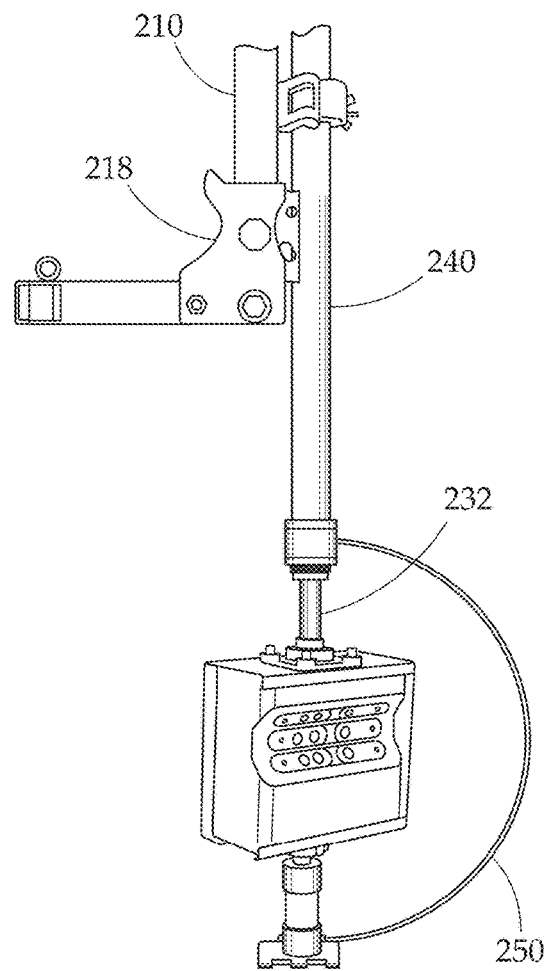
FIG. 14 illustrates a side perspective view of an embodiment of a mounting system for deployment of the instant system for encasing and delivering a camera via an embarked vehicle, further illustrating the mating system attached to the mounting and lowering shaft which supports and deploys the encasing and delivering system, and further illustrating the receiving shaft retaining the casing guide or guide shaft.

FIG. 14 illustrates a side perspective view of an embodiment of the vehicle mounting system for deployment of the instant system for encasing and delivering a camera via an embarked vehicle, further illustrating the receiving shaft 210, the rotation socket joint 218 the receiving shaft 240 for retaining and lowering the casing guide shaft 230 which has a telescoping capability. Further illustrated is the telescoping shaft 232 of the instant embodiment and this structure allows for the raising and lowering of the camera in with respect to the casing guide shaft 230. Further attached to the telescoping shaft 232 and is an embodiment of a dual bowed armed retaining arm for lowering the camera.

Figure 15:
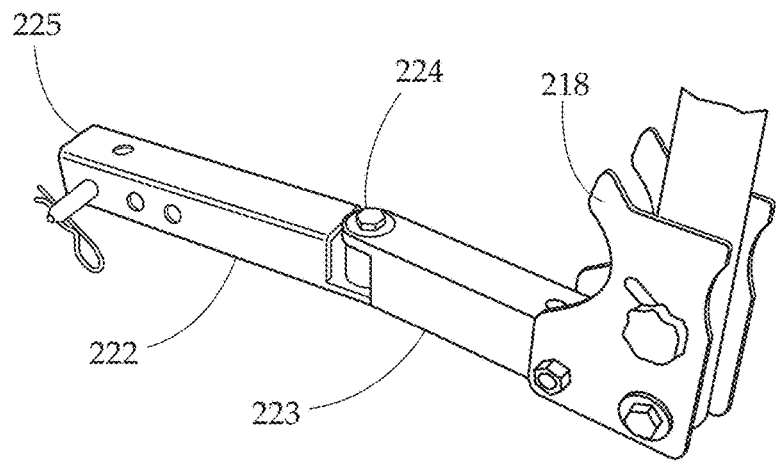
FIG. 15 illustrates a right side perspective view of an embodiment of a mounting system for deployment of the instant system for encasing and delivering a camera via an embarked vehicle, illustrating the mating system which includes the receiving shaft for attachment to the mounting and lowering shaft which supports and deploys the encasing and delivering system, and illustrating the trailer hitch mechanism.

FIG. 15 illustrates a right side perspective view of an embodiment of a portion of the vehicle mounting system 200, in particular illustrating a close view of the trailer hitch linkage 220, which includes a set of bar members, here shown as a first rectangular bar member 222 and a second bar member 223, joining by a hinge 224 in order to provide rotational degrees of freedom for maneuvering of the casing guide shaft 240 into proper deployment position. The hinged linkage design also provides for easy stowage as the set are of bar members folds upon itself. Further illustrated is the trailer hitch mechanism 225.

Figure 16:
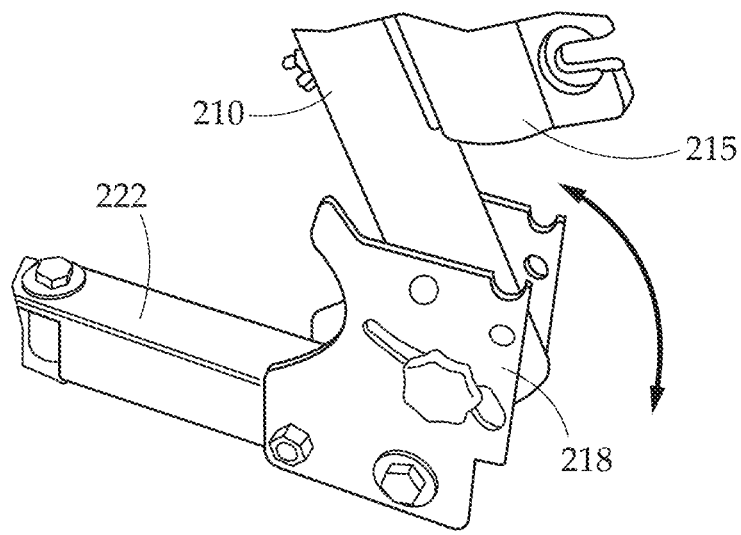
FIG. 16 illustrates a right side perspective view of an embodiment of a mounting system for deployment of the instant system for encasing and delivering a camera via an embarked vehicle, illustrating the mating system attached to the mounting and lowering shaft which supports and deploys the encasing and delivering system, and further illustrating the rotational features and socket effect of the receiving shaft which links the trailer hitch mechanism to receiving shaft, wherein the receiving shaft retains the guide shaft as illustrated in FIG. 14.

FIG. 16 illustrates a right side perspective view of an embodiment of the rotation socket joint 218 illustrating the receiving shaft 210 and a portion of a lower clamp 215 in relation to first rectangular bar member 222 of the trailer hitch linkage and further illustrating the rotational features and socket effect of the receiving shaft which links the trailer hitch mechanism to receiving shaft, wherein the receiving shaft retains the guide shaft as illustrated in FIG. 14.

Figure 17:
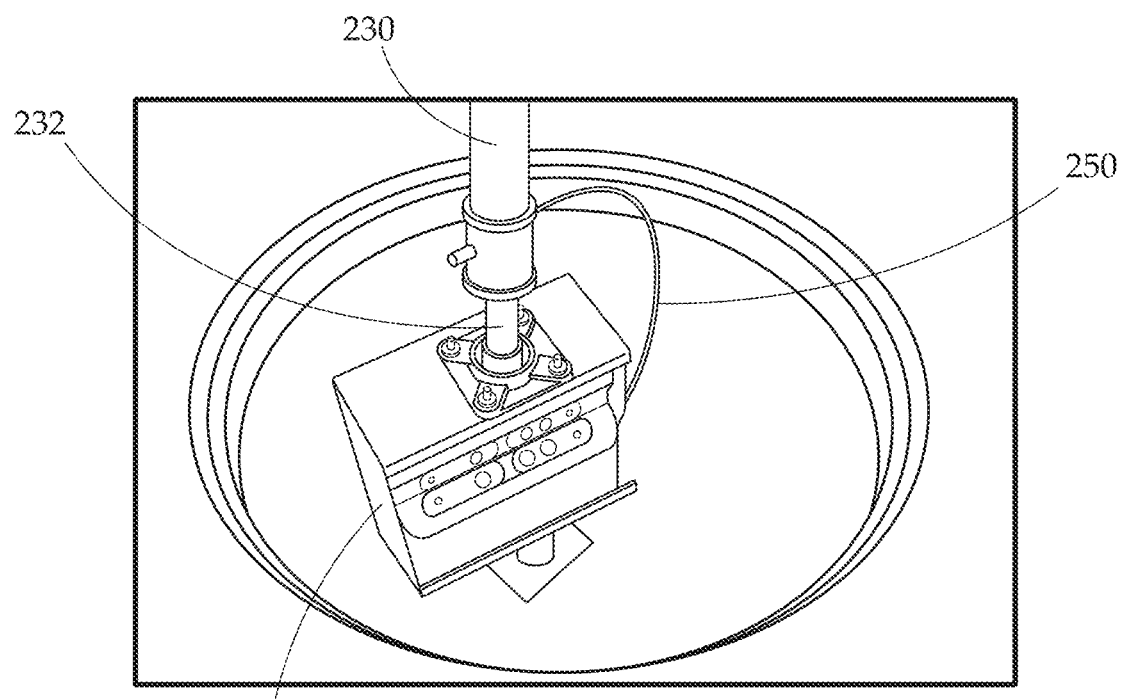
FIG. 17 illustrates a top perspective view of an embodiment of the mounting system for deployment of the instant system for encasing and delivering a camera via an embarked vehicle being lowered into a subterranean region via the guide shaft.

FIG. 17 illustrates a top perspective view of an embodiment of the vehicle mounting system for deployment of the instant system for encasing and delivering a camera via an embarked vehicle being lowered into a subterranean region via the guide shaft, specifically illustrating a containment vessel 82 delivering a camera 80, wherein the containment vessel 82 is an embodiment of a single bowed retaining arm 250 and is attached to the telescoping shaft 232 of the guide shaft 230. Further illustrated is of the instant embodiment and this structure allows for the raising and lowering of the camera in with respect to the casing guide shaft 230.

Figure 18:
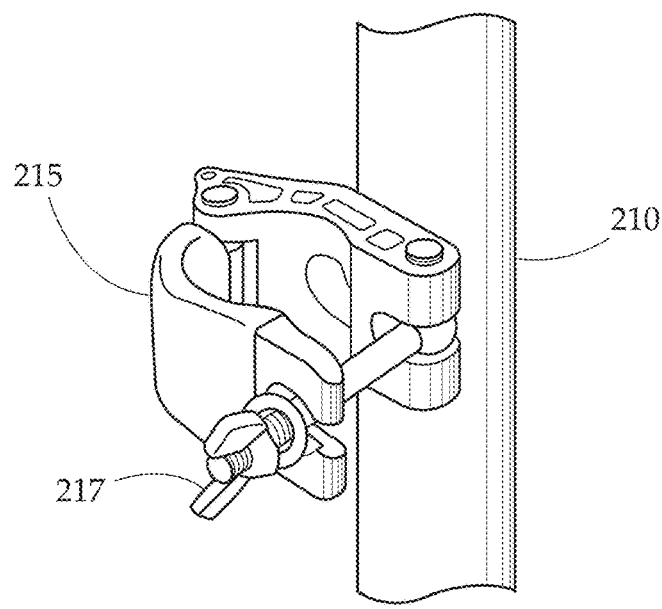
FIG. 18 illustrates a left side perspective view of the receiving shaft which receives and retains the guide shaft and additionally illustrating one of the retaining clamps.

FIG. 18 illustrates a left side perspective view of a portion of the receiving shaft 210 and additionally illustrate an individual of the retaining clamps 215 of receiving shaft, further illustrating the adjustment mechanism for the retaining clamp 215 which in one embodiment maybe a rotational wingnut assembly 217.

Figure 19:
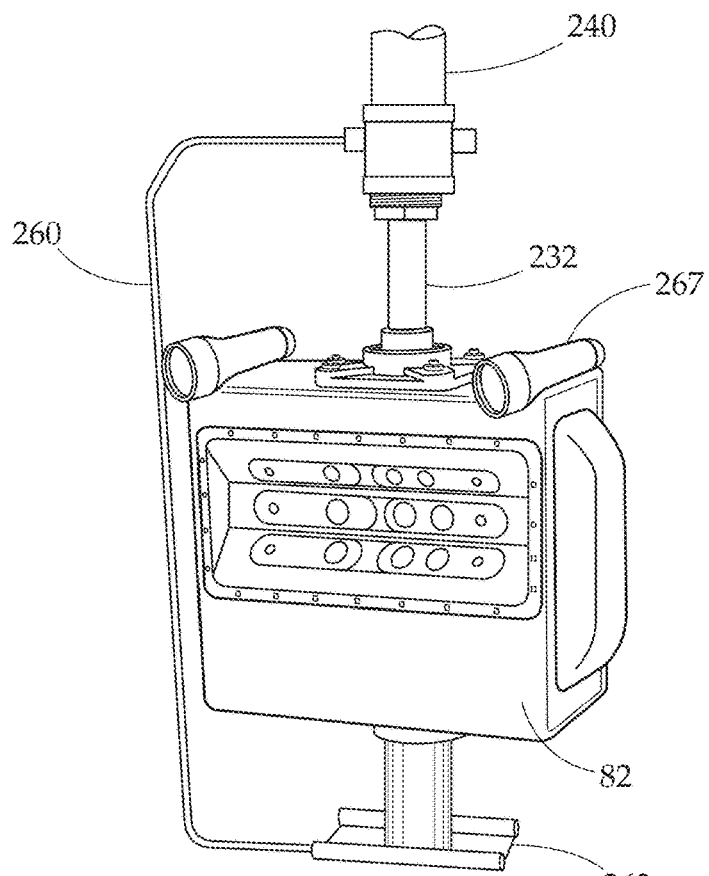
FIG. 19 illustrates a front perspective view of an additional embodiment of the instant system for encasing and delivering a camera including a containment vessel, a illustrating a singular rectangular oriented, non-bowed retaining arm.

FIG. 19 illustrates a front perspective view of an additional embodiment of the instant system for encasing and delivering a camera including a containment vessel, illustrating the receiving shaft 240 for retaining and lowering the casing guide shaft 230 which has a telescoping capability. In an additional embodiment, the system has been reconfigured to embody a uni-strut structure wherein one of the struts used to secure the mounting box has been removed as it was unnecessary in keeping the camera stable. Doing so also removes ½ half of visual obstructions passing before the camera lens every 360° sweep.

In an additional embodiment, the system may be reconfigured to reflect a changed in the shape of the strut and thus the bowed semi-circular configuration has been replaced with an angular rectangle. This embodiment now allows the strut to pass just beyond the rotational distance to the camera and additionally affords the overall system a narrower profile, thus enabling the system to fit into smaller openings such as found in electrical room entry ports. Moreover, as the rectangular configuration eliminates the bowed strut configuration, the requirement to utilize a lengthy shaft on top of the system or such a tall mounting at the bottom. In at least one embodiment, these two elements may encompass stainless steel custom milled pieces. Of high import, as the bottom mount is now shorter, the system affords the ability to position the camera much closer to the bottom of areas to be inspected.

Attached to the casing guide shaft 230 is an embodiment of the singular or uni-strut rectangular retaining arm 260 for lowering the camera and a telescoping shaft 232 which allows for the raising and lowering of the camera in with respect to the casing guide shaft 230. Further illustrated are the singular rectangular oriented, retaining arm 260 and an additional embodiment of the base mount 262. The singular rectangular retaining arm 260 features a non-bowed shaped which allows the singular rectangular retaining arm 260 to be spatially oriented closer to the profile of the containment vessel 82. Further illustrated is a set of illumination lights 267.

In additional embodiments, a system comprising a polymeric, water-resistant enclosure, which exhibits a lighting system may be mounted on top and a bottom sensor may be utilized to keep the camera from bottoming out. For the lighting system, mounts for LED flashlights, or a hook and loop system may be utilized. The plastic housing will be water resistant, however not submersible may include a rubber sealed end cap and clear polymer (or glass) faceplate.

Regarding materials to be utilized for the present system, numerous materials and manners of manufacture may be utilized. In addition to various metallic iterations, in one embodiment the system may be manufactured from thermoplastic as opposed to steel and in an additional embodiment, the system may be produced with the use of a 3D Printer and materials such ABS plastic.

Figure 20:
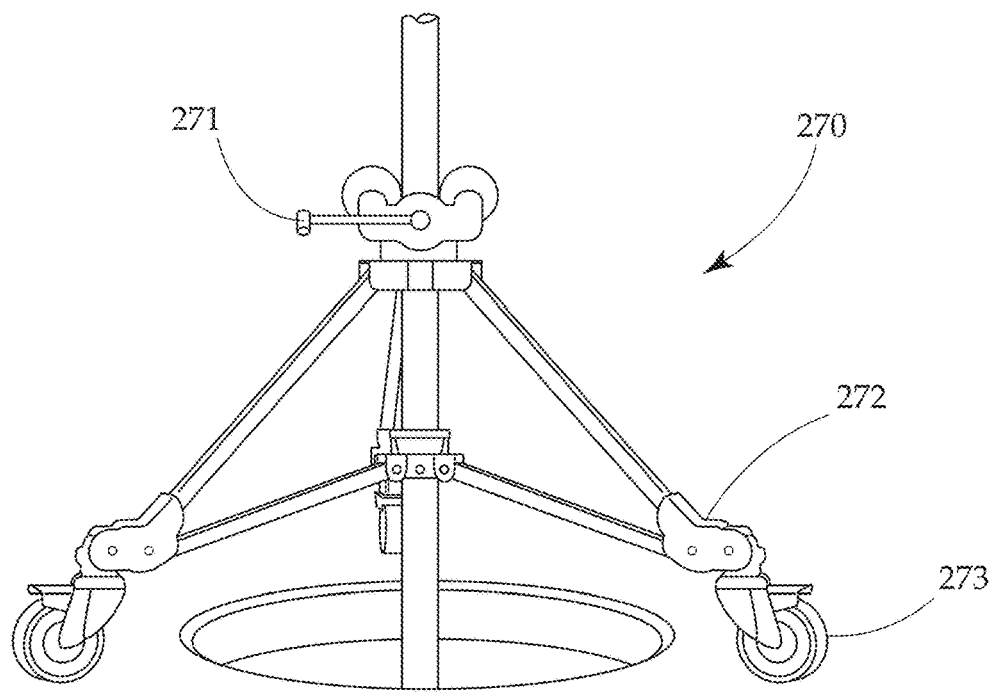
FIG. 20 illustrates a front perspective view of an additional embodiment of the instant system for encasing and delivering a camera utilizing a tripod assembly.

FIG. 20 illustrates a front perspective view of an additional embodiment of the instant system for encasing and delivering a camera utilizing a one version of a tripod assembly 270.

In an additional embodiment for designed for lowering the apparatus to subterranean regions, a tripod assembly 270 which remains located at the surface, may be utilized. The tripod may be modified in order to allow a shaft to pass through and the tripod may be equipped with the ability to secure the shaft tightly.

In one embodiment, the tripod may include a hand cranked 271 (future electric motor driven) geared mechanism with two grooved rubberized rollers which will grip the aluminum shaft from either side. In one embodiment, a spring(s) may be utilized to draw the two wheels towards each other allowing for the joining coupling between connected poles to pass through while remaining under tension. Each of the tripod legs 272 may be set on wheels 273 for portability, and may have a dual member design for strength purposes. In one embodiment, a breaking system may be wherein a lever may be employed to positively obstruct the gears and will also be used for changing the directional attitude.

Figure 21:
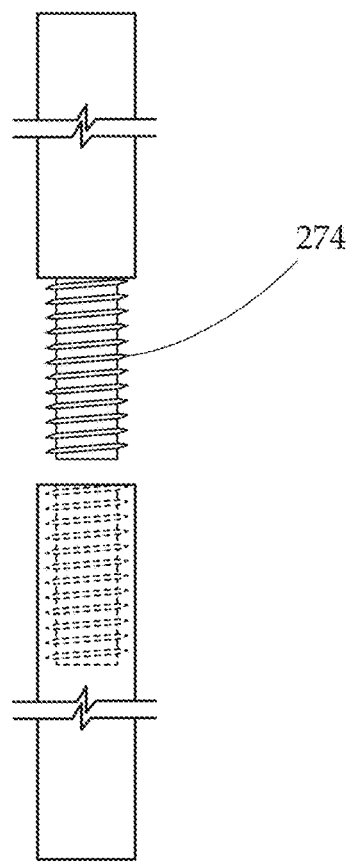
FIG. 21 illustrates a front perspective view of one embodiment of the shaft of a tripod assembly for encasing and delivering a camera utilizing a tripod assembly.

FIG. 21 illustrates a front view of one embodiment of the shaft of the mast 274. With pressure and friction, they will rotate in opposite directions on either side of the pole and in doing so will both raise and lower the mast 274 (shaft) smoothly and securely with ease.

Figure 22:
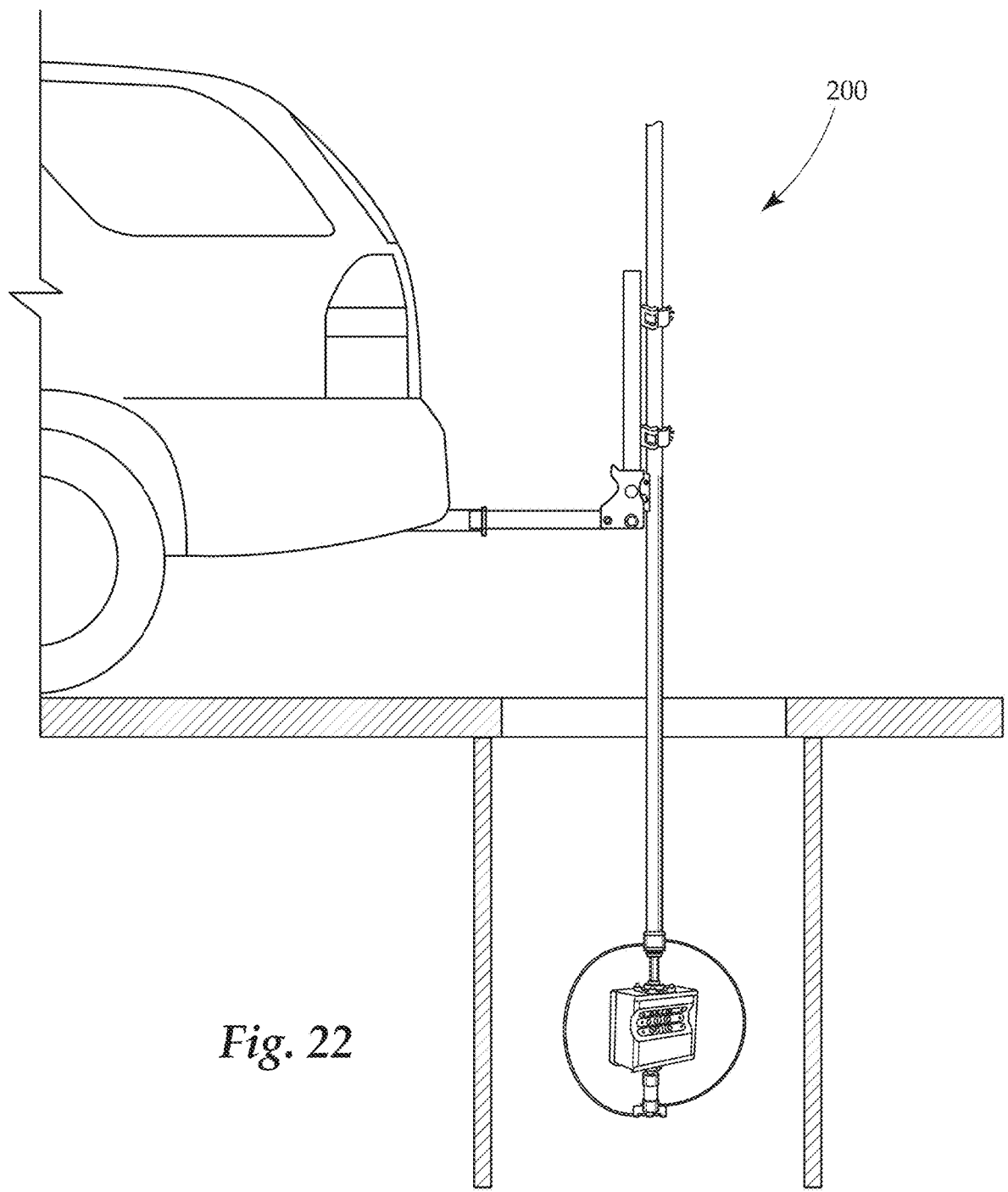
FIG. 22 illustrates a side perspective view of an embodiment of a mounting system for deploying the instant system for encasing and delivering a camera via an embarked vehicle, wherein the mounting system is attached to a vehicle and the system for encasing and delivering the camera is deployed in a subterranean region.

FIG. 22 illustrates a side perspective view of an embodiment of a vehicle mounting system 200 for deploying the instant system for encasing and delivering a camera, wherein the mounting system is attached to a vehicle and the system for encasing and delivering the camera is deployed in a subterranean region.

Figure 23:
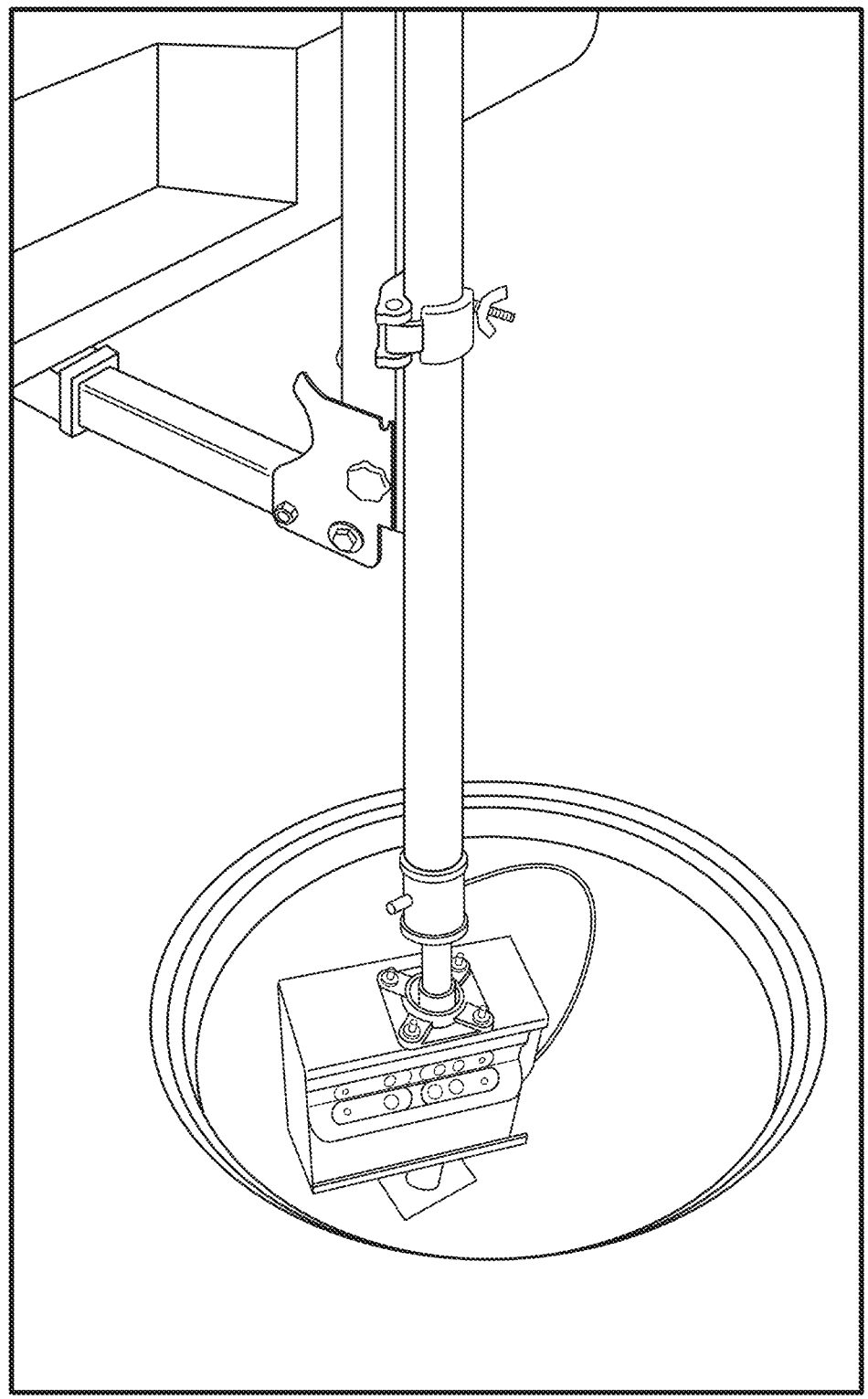
FIG. 23 illustrates a top perspective view of an embodiment of a mounting system for deployed the instant system for encasing and delivering a camera via an embarked vehicle wherein the mounting system is attached to a vehicle wherein the system for encasing and delivering the camera is deployed in a subterranean region.

FIG. 23 illustrates a top perspective view of an embodiment of the vehicle mounting system for deploying the instant system for encasing and delivering a camera via an embarked vehicle wherein the mounting system is attached to a vehicle wherein the system for encasing and delivering the camera is deployed in a subterranean region.

In an additional embodiment of the tripod based delivery system, a specialized spring tension and lateral stabilizing system designed for peak performance and response while in subterranean regions is introduced. The system is design to maintain tension upon and smoothly guide the casing guide shaft 240 to deliver the camera.

As illustrated in FIG. 24, a side view of the second embodiment of a tripod based delivery system 290, the system features a hand crank system 291, which works in conjunction with a spring guidance system 292, a set of three telescoping leg members 293 joined in unison by an upper collar 294, and a locking mechanism 295 to lock the set of three telescoping leg members 293 and the casing guide shaft 240 in place.

FIG. 25A illustrates a side exploded view of the spring guidance system 292. The spring guidance system 292 may include a common extension spring 296, in one embodiment the spring may be a ten inch (10") spring. The system may include a middle collar 297 manufactured from one piece of metallic, or other appropriate material, with a set of tabs 298 (which may be milled, machined, extruded, weaved or manufactured in any manner necessary). The middle collar 297 may be disposed to receive a set of lateral stabilizing struts 299 by utilizing of the set of tabs 298.

Also attached to the middle collar 297 there may be a set of curved petals, or retaining hooks 300 shaped substantially analogous to a letter "J." The retaining hooks 300 may be utilized to support and orient a set of grommets or cylindrically disposed common extension spring conduits 301. The spring conduits may comprise sections of PVC (or any appropriate metallic, polymeric, or composite or material) and the common extension spring 296 may be reeved or guided through the set of spring conduits 301. Located between each of the conduits may be a set of bushings 302, which may be polymeric and pliable for shock absorption purposes.

FIG. 25B illustrates a side exploded view of the spring common extension spring 296 as removed from the system.

FIG. 26 illustrates a top exploded view of the spring guidance system 292, including the middle collar 297 and tabs 298, the set of lateral stabilizing struts 299, the retaining hooks 300, the set of grommets or cylindrically disposed common extension spring conduits 301. The spring conduits may comprise sections of PVC (or any appropriate metallic, polymeric, or composite or material) and the common extension spring 296 may be reeved or guided through the set of spring conduits 301. Located between each of the conduits may be a set of bushings 302, which may be polymeric and pliable for shock absorption purposes.

Thus, set of bushings 302 are retained in place by the spring conduits 301 and the overall system smoothly guides the casing guide shaft 240, either aluminum or non-conductive PVC to remain in tension while the couplings joining the segments pass through.

Figure 27:
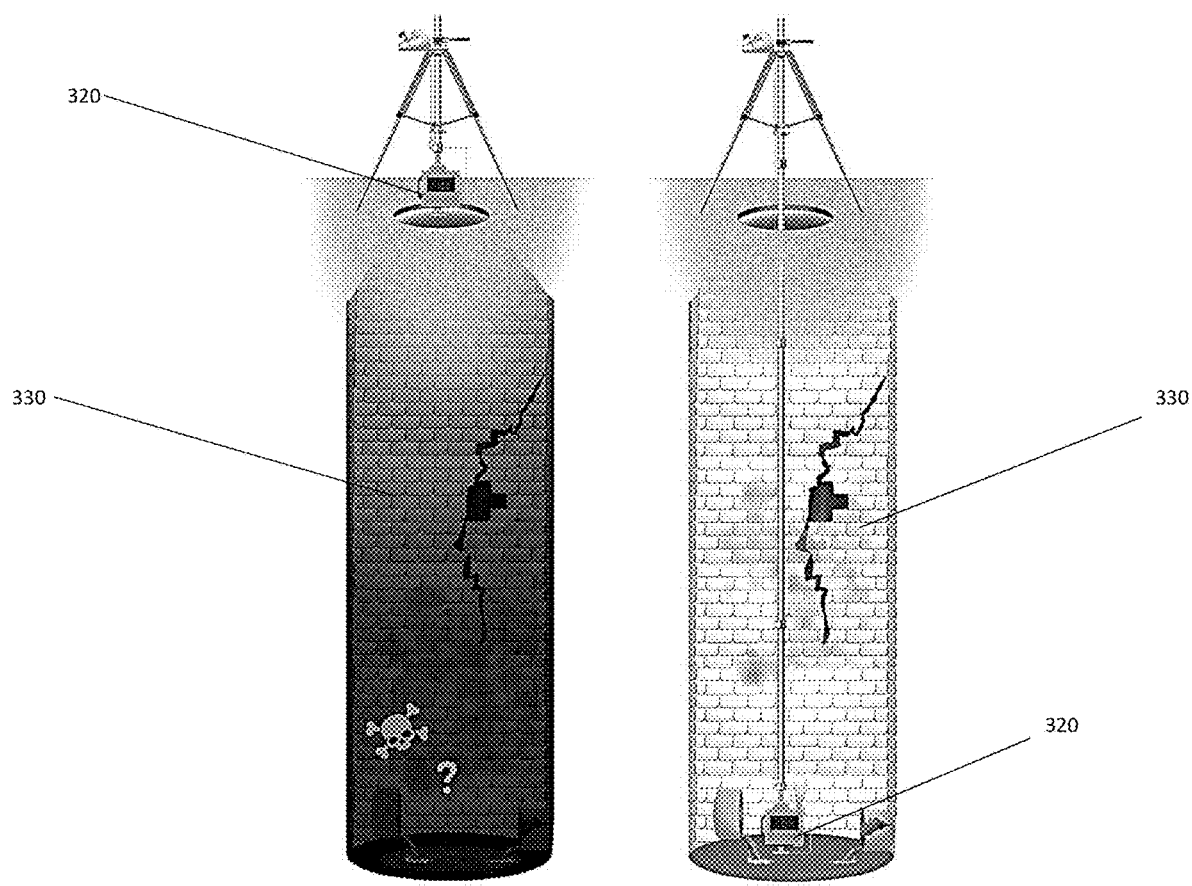
FIG. 27 illustrates cross-sectional side views of on embodiment of the instant camera delivery system prior to entering and deep within a subterranean environment, such as a manhole.

FIG. 27 illustrates cross-sectional side views of one embodiment of the instant camera delivery system 320 prior to entering and deep within a subterranean environment 330, such as a manhole for sewer, telecom date or the like. Such environments are notorious for hazardous conditions, including but not limited to noxious gases, pest issues, electrocution danger and contaminated water conditions. These are some of the many dangers faced by technicians looking to gather data in these environs.

The system when embarked in these environs produces a visual 3-D model which is measureable and viewable from any desktop or handheld device. The system also produces a Point Cloud for AutoCad® which is an extremely valuable and possibly life-saving tool as the instant system allows a technician to collect very effective data without ever breaching a manhole surface. Prior to the introduction of the instant system, 3-D cameras could only be utilized in above surface forums.

Prior to the introduction of the instant system to deliver 3-D cameras to these areas, the only options for a person looking to inspect such places was with a Laser scanner (which would only produce a point cloud of mathematical data, would not provide visual inspection and would not be cost effect as this could cost greater than $40,000) or with a "pole" camera which would be affixed to a stick and could not be integrated for measurement.

FIG. 28 illustrates a front perspective view of an additional embodiment of the camera delivery system 340 with the camera embarked illustrating, a containment vessel 382, a uni-strut rectangular retaining arm 360 and an LED light fixture 341 affixed to the front of the camera delivery system 340. The ground approach system that will let the operator know when the system is nearing the bottom using lights on top of the containment vessel 382 green/red. Such variants as glowing green when a 2 feet away from the bottom, red when one inch from either ground or water are utilized.

FIG. 29 illustrates a rear perspective view of an additional embodiment of the camera delivery system 340 with the camera embarked within the containment vessel 382 and illustrating a uni-strut rectangular retaining arm 360 and a sonic sensor proximity gage 342 affixed to the lower portion of the containment vessel 382. The sonic sensor proximity gage 342 allows the user to have notice when the camera delivery system 340 is nearing the bottom of the water level of a subterranean space.

FIG. 30 illustrates a front perspective view of an additional embodiment of base mount 343 designed specifically for operation with the single or uni-strut rectangular retaining arm 360 the camera delivery system 340.

FIG. 31 illustrates a bottom perspective view of the containment vessel 382 without the camera embarked and illustrating the sonic sensor proximity gage 342 affixed to the lower portion of the containment vessel 382. The sonic sensor proximity gage 341 allows the user to have notice when the camera delivery system 340 is nearing the bottom, or water level, of a subterranean space.

FIG. 32 illustrates a side view of the containment vessel 382 without the camera embarked and illustrating the removably attached locking bar 385 affixed to the side portion of the containment vessel 382.

FIG. 33 illustrates a bottom perspective view of the containment vessel 382 without the camera embarked and illustrating the removably attached locking bar 385 affixed to the side portion of the containment vessel 382. The locking bar 385 may attach by snaps, hook and loop mating or any other attachment system known in the art.

In an additional embodiment for designed for lowering the apparatus to subterranean regions, a tripod assembly which remains located at the surface, may be utilized. The tripod may be modified in order to allow a shaft to pass through and the tripod may be equipped with the ability to secure the shaft tightly.

In an additional embodiment, a system which is designed to be deployed via an embarked vehicle is conceptualized. In said embodiment, a system deemed as the SubCam™ trailer hitch mounting provides the user the ability to launch and operate the instant system directly from a vehicle, which affords the user the ability to operate in shelter during inclement weather.

What is claimed is:

1. A system for lowering and guiding a 3D camera apparatus comprising:
   a pole mechanism;
   a top mount mechanism mounted directly above the 3D camera apparatus and fixed to the pole mechanism;
   a base mount mechanism;
   at least one cage bar apparatus;
   a rotational apparatus in mechanical communication with the 3D camera apparatus and the base mount mechanism; and
   a receiving mechanism disposed to couple the rotational apparatus with a rotating member of the 3D camera apparatus; wherein the 3D camera apparatus rotates parallel with the horizontal plane of the rotational apparatus.

2. The system for lowering and guiding a 3D camera apparatus of claim 1 wherein the base mount comprises a shape selected from the group consisting of circular, rectangular, triangular, or elliptical.

3. The system for lowering and guiding a 3D camera apparatus of claim 1 wherein the base mount comprises metal coupling and ball bearing assembly.

4. The system for lowering and guiding a 3D camera apparatus of claim 1 wherein the at least one cage bar apparatus is in mechanical communication with the top mount mechanism and the base mount mechanism.

5. The system for lowering and guiding a 3D camera apparatus of claim 1 wherein the at least one cage bar is removably attached to the base mount mechanism by passing through the metal coupling above the bearing assembly and secured to the base mount by tension or clamp.

6. The system for lowering and guiding a 3D camera apparatus of claim 1 wherein the rotational apparatus is removably attached to the camera apparatus with a screw assembly.

7. The system for lowering and guiding a 3D camera apparatus of claim 1 wherein the top mount is comprised of metal or plastic and is in communication with a camera apparatus through ball-bearing assembly.

8. The system for lowering and guiding a 3D camera apparatus of claim 1 wherein the top mount ball-bearing assembly is in communication with the pole.

9. The system for lowering and guiding a 3D camera apparatus of claim 1 wherein the camera apparatus is supported from above.

10. The system for lowering and guiding a 3D camera apparatus of claim 1 further comprising a water-resistant enclosure, a lighting system and a lower level sensor apparatus.

* * * * *